United States Patent [19]

De Haan et al.

[11] Patent Number: 4,921,682

[45] Date of Patent: May 1, 1990

[54] PROCESS FOR REMOVING HYDROGEN SULPHIDE FROM GAS STREAMS

[75] Inventors: Robert De Haan; Mark E. Dry; Flemming H. Dressler, all of Sasolburg; Horst J. F. A. Hesse, Vanderbijlpark; Sonet Vermaire, Sasolburg, all of South Africa

[73] Assignee: Sasol Operations (Pty) Ltd., Johannesburg, South Africa

[21] Appl. No.: 205,890

[22] Filed: Jun. 13, 1988

[51] Int. Cl.$^5$ .................. C01B 17/16; C01B 31/20; C01B 17/02

[52] U.S. Cl. .................. 423/225; 423/226; 423/232; 423/576.5; 423/576.7

[58] Field of Search .................. 423/232, 233, 573 R, 423/225, 220, 576.5, 576.7

[56] References Cited

U.S. PATENT DOCUMENTS

| | | | |
|---|---|---|---|
| 4,206,194 | 6/1980 | Fenton et al. | 423/226 |
| 4,243,648 | 1/1981 | Fenton | 423/573 R |
| 4,283,379 | 8/1981 | Fenton et al. | 423/571 |
| 4,434,143 | 2/1984 | Weber | 423/225 |
| 4,434,145 | 2/1984 | Weber | 423/573 R |
| 4,434,146 | 2/1984 | Weber | 423/226 |
| 4,526,773 | 7/1985 | Weber | 423/226 |
| 4,541,998 | 9/1985 | Weber | 423/226 |

Primary Examiner—John Doll
Assistant Examiner—Lori F. Cuomo
Attorney, Agent, or Firm—Millen, White & Zelano

[57] ABSTRACT

Processes for the removal of hydrogen sulphide from gas streams and for the regeneration of spent scrubbing liquor used in an absorber to remove hydrogen sulphide from a gas stream, are disclosed. In the former process, hydrogen sulphide is removed by five-valent oxovanadium which is simultaneously reduced to its four-valent state, the precipitation of which is prevented by having a sufficiently high concentration of total alkalinity present in the scrubbing solution. In the latter process the four-valent oxovanadium is oxidized to its five-valent state, preferably by an oxygen-containing gas, and a suffficently high concentration of total alkalinity is provided in the scrubbing liquor to yield a desired re-oxidation rate of the four-valent oxovanadium.

10 Claims, 2 Drawing Sheets

PROCESS FOR REMOVING HYDROGEN SULPHIDE FROM GAS STREAMS

FIELD OF THE INVENTION

This invention relates to the removal of hydrogen sulphide from gas streams. More particularly, the invention relates to a process in which an aqueous solution containing oxometallate species is used to scrub hydrogen sulphide from the gas stream, the oxometallate being reduced by the sulphide, which in turn is simultaneously oxidized, preferably to elemental sulphur. The invention further relates to a process in which the spent scrubbing liquor is regenerated by reoxidizing the reduced oxometallate to its original oxidation state.

BACKGROUND OF THE INVENTION

Processes for the removal of low concentrations, especially concentrations below 2% by volume, of hydrogen sulphide from gas streams are known, in which aqueous alkaline scrubbing solutions containing metal ions or oxometallate species are used to oxidize the hydrogen sulphide and/or its dissociated ions to elemental sulphur during an absorption or scrubbing step, the solution being regenerable, through oxidation, for re-use. Examples of such processes are the Stretford and Takahax processes. Variants of and improvements in these processes are also known and some of these are described in U.S. Pat. No. 4,243,648, RSA Patent No. 83/0444, U.S. Pat. No. 4,206,194, UK Patent No. 2029386, RSA Patent No. 82/3577, U.S. Pat. No. 4,283,379 and RSA Patent No. 82/4576.

The metal ions or oxometallate species used in most of these processes are usually selected from a group consisting of iron, vanadium, copper, manganese and nickel, with vanadium being a preferred member of the group. The vanadium is usually present as complex vanadates and/or other oxometallate species, preferably in the five- or four-valent oxidation state. During the absorption step, the vanadium is reduced from the five-valent to the four-valent state, while the sulphur of the hydrogen sulphide is simultaneously oxidized to elemental sulphur. During the regeneration step, the four-valent vanadium is reoxidized to the five-valent state.

One of the problems encountered with processes employing vanadium is the relatively low solubility of four-valent vanadium in water or alkaline scrubbing liquors resulting in a tendency of the four-valent vanadium to precipitate during the absorption step. To overcome this problem, some conventional processes rely on complexing agents such as citric, maleic or tartaric acid. Another problem encountered is the relatively low rate of oxidation of the four-valent vanadium to five-valent vanadium in the regeneration step. Alternatively or additionally, an oxidizing agent or promoter, such as a salt of anthraquinonedisulphonic acid (ADA), is added in other conventional processes to assist reoxidation of the vanadium. Other promoters which may be used are organic nitrogen compounds, inorganic amines, and carbohydrates (see RSA Patent No. 83/0444). Non-quinone aromatic compounds and water soluble carboxylate complexing agents (U.S. Pat. No. 4,283,379) capable of maintaining tetravalent vanadium in solution have also been proposed. Some of these compounds could have a dual function, namely to promote the oxidation of the metallic species in the regeneration step, and to act as complexing agent to keep the tetravalent vanadium in solution in the scrubbing step.

RSA Patent No. 82/4576 describes a process for preventing losses of vanadium in oxidative hydrogen sulphide scrubbings with an aqueous alkaline scrubbing agent containing five-valent vanadium as the oxidizing agent, in which a minimum content of carbonate ions of 12.5 g/l is maintained in the scrubbing agent, with a preferred concentration of between 13 and 17 g/l. However, all the experiments conducted in support of this patent specification were carried out with a scrubbing agent which also contained ADA. It has been found that ADA, although acting as an oxidation promoter in the oxidation of the vanadium in the regeneration step, also acts as a complexing agent, thereby maintaining otherwise insoluble tetravalent vanadium in solution. This has been confirmed by experiments conducted by the applicant in the absence of ADA, in which it was found that, with at least some carbonate ion concentrations in accordance with the teachings of RSA patent No. 82/4576 but in the absence of a complexing agent, vanadium precipitated from the scrubbing liquor.

As will be appreciated by those skilled in the art, the aforementioned complexing agents and oxidation promotors are expensive, and could cause pollution problems associated with the effluent from plants in which such chemicals are used.

There accordingly exists a need for a hydrogen sulphide removal process and a scrubbing liquor regeneration process in which the aforementioned problems are at least partially overcome.

OBJECTS AND SUMMARY

An object of the present invention is to provide a process for the removal of hydrogen sulphide from sour gas streams containing carbon dioxide and hydrogen sulphide, in which a scrubbing solution comprising five-valent oxovanadium is contacted with the gas stream, and in which process any four-valent oxovanadium formed as a result of such contacting step, is maintained in solution in the absence of conventional complexing agents.

A further object of the invention is to provide a process for the regeneration of spent scrubbing liquor containing four-valent oxovanadium, by reoxidising the four-valent oxovanadium in the presence of an oxygen-containing gas from its four-valent to its five-valent state, in which process a desired rate of reoxidation of the oxovanadium is obtained in the absence of conventional reoxidation promoters.

According to one aspect of the invention there is provided a continuous process for removing hydrogen sulphide from a sour gas stream containing hydrogen sulphide and carbon dioxide, comprising a step of contacting the gas stream with a scrubbing liquid comprising dissolved five-valent oxovanadium and a concentration of total alkalinity greater than a concentration required to maintain in solution any four-valent oxovanadium formed as a result of such contacting step, the alkalinity being present in the form of mainly bicarbonate ions and such concentrations of hydroxyl and carbonate ions as would maintain the pH of the solution between 7.4 and 9 during the contacting step, the carbonate ion concentration, expressed as carbonate, being below 12.5 grams per liter and the bicarbonate ion concentration expressed as sodium bicarbonate, being in excess of 30 grams per liter, the carbon dioxide concentration in the sour gas being sufficiently high to maintain the pH of the liquor below 9 and above 7.4 over a protracted period of time.

The scrubbing liquor is preferably substantially free of complexing agents capable of preventing four-valent oxovaladium from precipitating from the liquor.

As used in this specification, the term "substantially free" means a maximum concentration of 10 grams per liter, preferably a maximum concentration of 1 gram per liter and more preferably, a maximum concentration of 0.01 gram per liter.

We have found that there is no harm in adding conventional organic complexing agents such as ADA, citric acid or diethanolamine, but a substantial advantage of the present invention is that it is possible to avoid the addition of such costly complexing agents.

The alkalinity may be in the form of hydroxide and/or carbonate and/or bicarbonate. Depending on the cost of chemicals such as bicarbonate of soda and soda ash, which in both cases is normally significantly less than conventional additives such as ADA, citric acid or diethanolamine, the alkalinity may be provided originally in the scrubbing solution as $NaHCO_3$, $Na_2CO_3$ or even NaOH. Since the sour gas stream to be treated in the process according to the invention contains carbon dioxide, the alkalinity will, upon absorption of the carbon dioxide from the sour gas, eventually be converted largely into sodium bicarbonate, while the pH will decrease from an initial pH which will be above 9 to a pH within the abovementioned range in which the alkalinity is mainly present in the form of bicarbonate. However, until a pH of well below 10, preferably below 9, is reached, four-valent vanadium can be expected to precipitate from the scrubbing liquor, since we have found that at a pH at about 10 and at the same total alkalinity level which is sufficient to maintain tetravalent vanadium in solution at a lower pH of about 8.5, a black precipitate (possibly vanadium carbonate) is formed in due course in the absence of a complexing agent sufficient to maintain the vanadium (IV) in solution under such circumstances.

Thus, for instance, in the case of a sour gas containing 27% by volume of carbon dioxide, the absorption of the carbon dioxide in a scrubbing liquor having a high pH will not only reduce the concentration of hydroxyl ions in favor of carbonate ions, and carbonate ions in favor of bicarbonate ions, but will also cause the pH to decrease to a value of about 9 for a scrubber operating temperature of about 35°–40° C. At higher $CO_2$ concentrations in the sour gas, a lower pH can be reached. It has been found that the lowest pH that can be reached with $CO_2$ concentrations of higher than 27%, employing a commercial size scrubber operating at the aforementioned temperature of about 35°–40° C., is approximately 7.4. The pH that would result from a particular concentration of $CO_2$ in the sour gas is, however, dependent on the efficiency of the gas-liquid contact in the scrubber, as well as on the operating temperature thereof. In contrast to carbondioxide, the hydrogen sulphide in the sour gas does not affect the pH of the scrubbing liquor to a significant degree because it is converted to elemental sulphur and water.

The solubility of the four-valent vanadium formed as a result of the reduction of the five-valent vanadium by $H_2S$ is dependent on the alkalinity, as can be seen in FIG. 1. Since the amount of four-valent vanadium formed during the absorption step is stoichiometrically related to the amount of $H_2S$ absorbed according to the equation $$2V(V+) + S(II-) \rightarrow 2V(IV+) + S(O)$$

the alkalinity required to prevent precipitation of four-valent vanadium depends indirectly also on the $H_2S$ loading.

The concentrations of V(V) and total alkalinity to be provided in the scrubbing liquor may be selected as follows. For a given $H_2S$ loading, a V(V) concentration and scrubbing liquor flow rate are selected such that the total V(V) to be contacted with the sour gas per unit of time is stoichiometrically in excess of the amount required to scrub out substantially all of the $H_2S$. A total alkalinity value consistent with a desired pH of say 8 is then experimentally determined for the scrubbing liquor, the total alkalinity to be in excess of what would be required to maintain in solution all of the V(IV) expected to be formed during reduction of the V(V) in the scrubber by the $H_2S$ in the sour gas stream.

Figure 1:
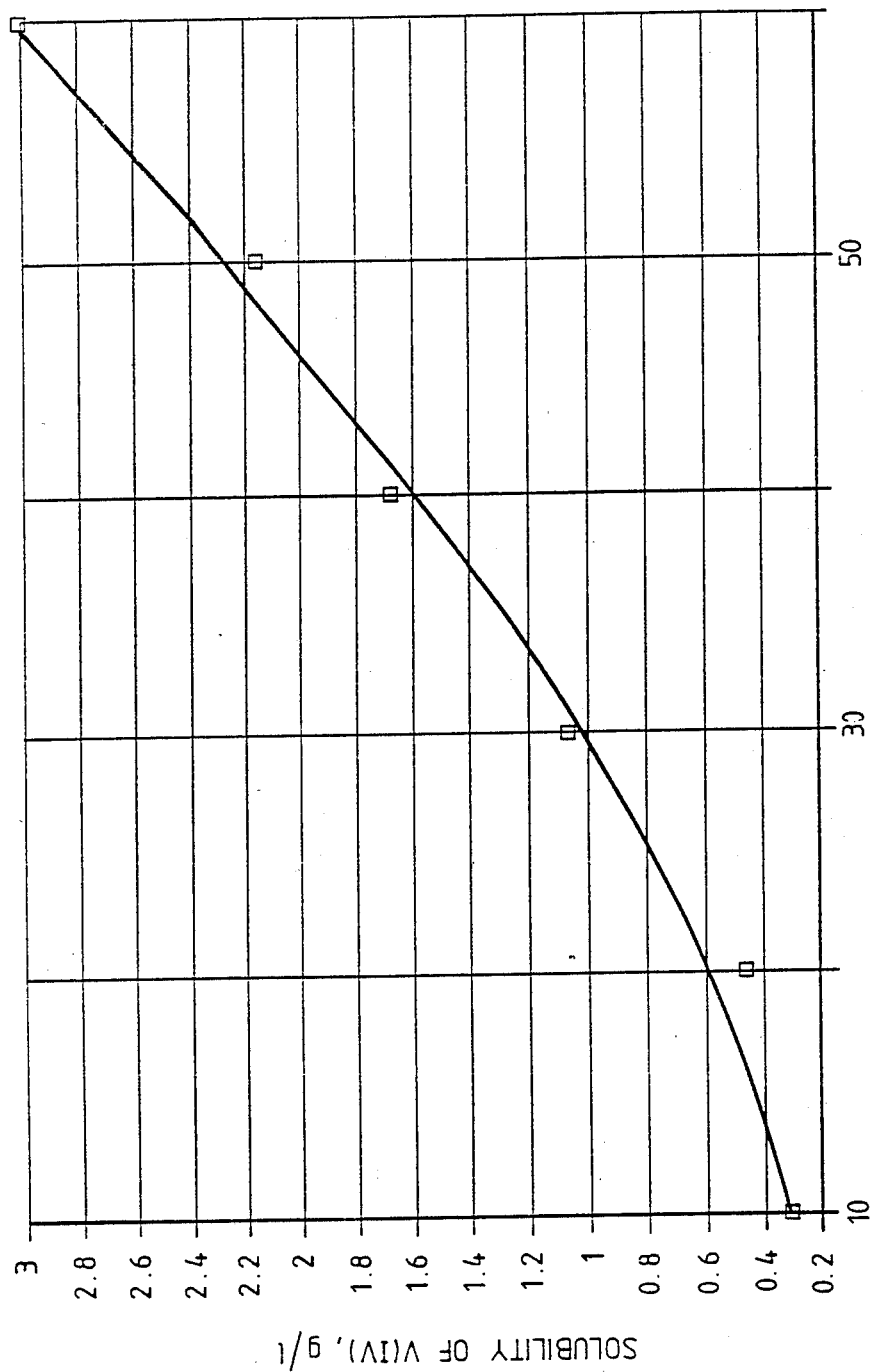
FIG. 1 shows the relationship between concentration of total alkalinity and vanadium concentration for Example 1.

The concentration of total alkalinity required to maintain in solution an expected vanadium (IV) concentration at room temperature and at a pH of 8 has been determined experimentally in Example 1. This relationship is presented graphically in FIG. 1. Since the solubility of vanadium (IV) would be expected to be different at different temperatures and pH values, the results of Example 1 are not necessarily applicable over the entire pH range of 7.4 to 9.0 specified for the invention, nor for different scrubber operating temperatures. However, for the particular conditions of pH and temperature prevailing in Example 1, an almost linear relationship was found between total alkalinity and solubility of vanadium (IV).

Furthermore, a ratio of total alkalinity (expressed as sodium bicarbonate) to vanadium (IV) concentration can be calculated for a given set of conditions of pH and temperature, once the relationship between vanadium (IV) concentration and total alkalinity has been established for those conditions. As an example, the ratio of total alkalinity (expressed as sodium carbonate) to vanadium (IV) concentration expected in the scrubbing liquor can be calculated for Example 1 as varying between about 20 and about 30 grams per liter of total alkalinity per gram per liter of vanadium (IV). Different ratios would apply to different conditions of pH and operating temperature. For the operating conditions as in Example 1, the ratio of total alkalinity expressed as sodium carbonate should therefore exceed 20 grams per liter per gram per liter of vanadium (IV). Such ratio should preferably exceed 30, in order to ensure that vanadium (IV) will be held in solution over the entire range shown in FIG. 1.

Subject to the concentration of the vanadium (V) in the scrubbing liquor for a given liquor flow rate being in excess of what would stoichiometrically be required to scrub out all of the $H_2S$, the concentration of vanadium (V) in the scrubbing liquor may be in the range of from about 0.1 g/l as V up to the solubility limit of five-valent vanadium (about 9 g/l at 38°), preferably between about 1 g/l and about 5 g/l, more preferably between about 1 g/l and about 2.5 g/l. Good results have been obtained with about 1.5 to about 2.5 g/l total vanadium in the liquor. In order to ensure an acceptable degree of removal of hydrogen sulphide from the gas stream, it is preferable to ensure that a minimum concentration of five-valent vanadium of about 0.4 g/l as V is maintained in the scrubbing liquor at the exit from the scrubber.

According to another aspect of the invention, there is provided a process for the regeneration of a spent scrubbing liquor used for the removal of hydrogen sulphide from a gas stream containing hydrogen sulphide by preferentially oxidizing the sulphur of hydrogen sulphide scrubbed out by the liquor to elemental sulphur with the aid of five-valent oxovanadium species in the scrubbing liquor, which species are simultaneously reduced from the five-valent to the four-valent state, the process including the steps of providing in the solution a sufficiently high concentration of total alkalinity to yield a desired reoxidation rate of the four-valent oxovanadium species, and oxidizing the oxovanadium species from the four-valent to the five-valent state by bubbling an oxygen-containing gas through the scrubbing liquor, the total alkalinity in the liquor being provided mainly in the form of bicarbonate ions and in such concentrations of hydroxyl and carbonate ions as would maintain the pH of the liquor between 7.4 and 9, the carbonate ion concentration, expressed as carbonate, being below 12.5 grams per liter, and the bicarbonate ion concentration, expressed as sodium bicarbonate, being in excess of 30 grams per liter.

The spent scrubbing liquor is preferably quinone, amine and organic oxidation promoter free.

Conveniently, the oxygen-containing gas is air.

We have found that within the pH range of 7.4 to 9, the rate of reoxidation of four-valent vanadium to five-valent vanadium at a given V(IV) concentration, temperature and oxygen concentration in the liquor, is substantially proportional to the alkalinity of the solution, and that an adequate reoxidation rate may be achieved without the use of conventional oxidation promoters.

Figure 2:
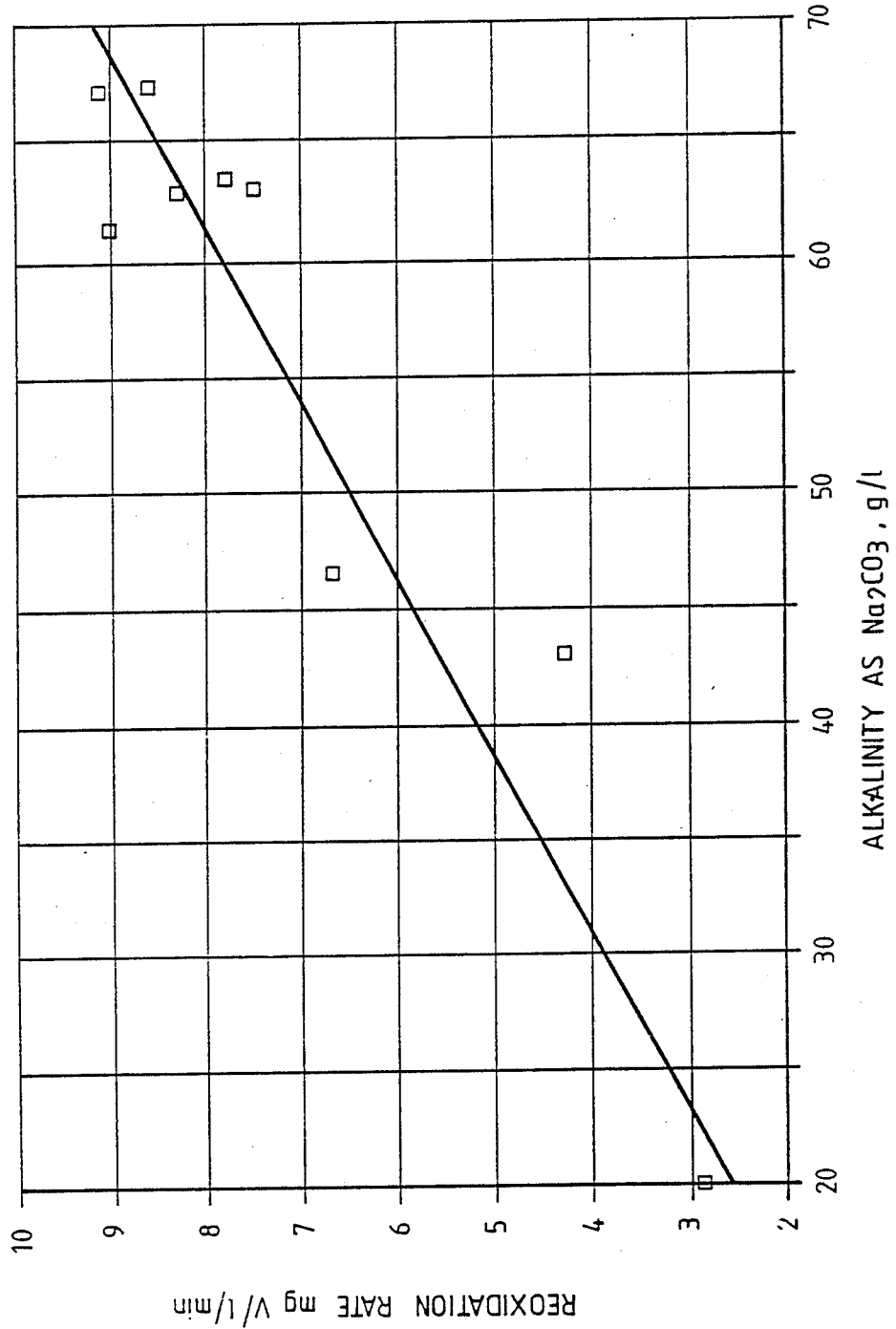
FIG. 2 shows the relationship between alkalinity and vanadium (IV) reoxidation rate.

Thus, for example, FIG. 2 gives the relationship between alkalinity and vanadium (IV) reoxidation rate for an experimental laboratory oxidizer at room temperature using nitrogen diluted air. For these conditions, the minimum concentration of total alkalinity that would be required for the reoxidation of a given concentration of vanadium (IV) per unit of time, can be determined as follows.

Assuming the concentration of vanadium (IV) in the spent scrubbing liquor is 1.2 grams per liter as in Example 2, and assuming further that the residence time of the scrubbing liquor in the oxidizer is 10 seconds, a reoxidation rate of 7.2 grams per liter of vanadium (IV) per minute would be required. From FIG. 2 it follows that, using nitrogen-diluted air in the experimental oxidizer at room temperature as in Example 2, a minimum total alkalinity, expressed as sodium carbonate, of approximately 55 grams per liter would be required to achieve the desired reoxidation rate of 7.2 grams of vanadium (IV) per liter per minute.

It is to be understood that, because of the special conditions used (such as nitrogen-diluted air), the results reported in FIG. 2 are not necessarily applicable to an existing or proposed new industrial installation. For such applications, it is considered advisable to experimentally determine the relationship between alkalinity and reoxidation rate for the particular conditions that would prevail, because of the influence of parameters such as oxidizer design, oxygen concentration, vanadium (IV) concentration and temperature on the oxidation rate.

A graph similar to FIG. 2 can thus be established for any commercial installation that would give the relationship between vanadium (IV) reoxidation rate and total alkalinity applicable to the specific conditions of operating temperature and oxidizer design, and hence dissolved oxygen concentration prevailing at the installation. Since reoxidation would normally be done with air, which has a known and substantially constant concentration of oxygen, the effect of the latter parameter does not have to be investigated for variations in the oxygen content of the gas which is used for reoxidation. However, the concentration of oxygen dissolved in the liquor is expected to effect the reoxidation rate, and this concentration is dependent on the rate of dissolution of oxygen in the scrubbing liquor, which in turn is a function of the design of and operating conditions prevailing in the oxidizer.

In experimental work we have found that at high ratios of the concentration of bicarbonate ion to the concentration of vanadium (V) (within the pH range of 7.4 to 9), the vanadium (V) is almost exclusively present in the form of a dimeric species $[H_nV_2O_7]^{(4-n)-}$. As the concentration of bicarbonate is lowered, a cyclic tetramer, $V_4O_{12}^{4-}$, is formed. Re-oxidation of the reduced dimeric species was found (by means of $^{51}V$-NMR studies) to proceed at a considerably higher rate than reoxidation of the reduced tetrameric species. At a pH of 9.46 and above, the dimeric species is rapidly converted to the monomer species which once reduced, reoxidizes at a much slower rate than the dimeric species.

The total alkalinity required to ensure an acceptable reoxidation rate can also be expressed as a carbonate:vanadium ratio. It is to be understood that within the pH range of 8.4 to 9, the alkalinity will be mainly present as bicarbonate.

As has been stated in connection with Example 7, a carbonate:vanadium ratio of more than about 14 [which is equivalent to an alkalinity, expressed as sodium carbonate, or 24.7 grams per liter per gram per liter of vanadium (IV)], the vanadium is mainly present as the dimer species of which the reoxidation rate is considerably faster than that of the tetramer. It follows therefore that alkalinity:vanadium ratios of more than 24.7, preferably more than 30, are desirable for the process according to the invention.

Where it is desired to combine the aforesaid processes in accordance with the invention, namely the process for the removal of hydrogen sulphide from a gas stream and the process for the regeneration of spent scrubbing liquor used for the removal of the said hydrogen sulphide, it would be necessary to be able to operate the process under steady-state conditions. This means that the reoxidation rate of the four-valent vanadium to the five-valent state in the oxidation step should at least be equal to the rate of reduction of the five-valent vanadium to the four-valent state in the absorption step. Also, only a single alkalinity level for both stages is required, and the alkalinity level which would be selected would thus be the higher of the two levels indicated respectively for the absorption and oxidation steps. It is, however, to be understood that the size of an oxidizer unit in which the oxidation step may be carried out, may be selected so as to increase or decrease the residence time of the spent scrubbing liquor in the oxidizer and to ensure a throughput (with the required rate of reoxidation) through the oxidizer which is at least adequate for steady-state operation.

According to a further aspect of the invention, there is provided a continuous process for removing hydrogen sulphide from a sour gas stream containing hydrogen sulphide and a minimum amount of carbon dioxide, including the steps of:

contacting the gas stream in a scrubber with a scrubbing solution comprising five-valent oxovanadium species, whereby the sulphur of the hydrogen sulphide is preferentially oxidized to elemental sulphur and the vanadium is simultaneously reduced to its four-valent state;

passing the scrubbing solution to an oxidized; and oxidizing the vanadium of the oxovanadium species in the oxidiser to the five-valent state, by bubbling an oxygen-containing gas mixture through the solution, the solution containing a sufficiently high concentration of total alkalinity at least to maintain in solution any four-valent oxovanadium formed in the scrubber, and to yield a reoxidation rate of the four-valent oxovanadium in the liquor at least high enough to permit steady-state operation of said process, the total alkalinity being present mainly in the form of bicarbonate ions and in such concentrations of hydroxyl and carbonate ions as would maintain the pH of the liquor between 7.4 and 9, the carbonate ion concentration, expressed as carbonate ions, being below 12.5 grams per liter, the bicarbonate ion concentration, expressed as sodium bicarbonate, being in excess of 30 grams per liter and the carbon dioxide concentration in the sour gas being sufficiently high to maintain the pH of the solution below 9.

The scrubbing solution may be substantially quinone, amine, organic complexing agent and organic oxidation promoter free.

Preferably, the oxygen-containing gas mixture is air.

EXAMPLES

EXAMPLE 1

The solubility of four-valent vanadium at pH 8 and ambient temperature as a function of total alkalinity (over the range 10 to 60 g/l, expressed as $Na_2CO_3$) was determined as follows. Six specimen solutions were made up each with about 5 g/l of five-valent vanadium and each having a different total alkalinity level at a pH of 8, the alkalinity (expressed as g/l $Na_2CO_3$) of the specimens increasing in steps of 10 g/l from 10 g/l to 60 g/l. Each solution also contained 20 g/l NaSCN, in addition to the alkali, in order to suppress the possible formation of thiosulphate. The five-valent vanadium was then reduced, at room temperature, with an excess of $H_2S$. The containers were tightly stoppered and stored for about three days. The mixtures were then filtered to remove suspended sulphur and any insoluble V(IV) that may have precipitated. Excess air was finally bubbled through the filtrates to reoxidize V(IV) to V(V), which was determined polarographically. The results are reported in the graph of FIG. 1.

In FIG. 1 the curve indicates the border line between the regions of solubility and of insolubility (i.e. incomplete solubility) of V(IV). (In this and subsequent paragraphs the amounts of four- and five-valent vanadium are expressed in terms of elemental vanadium. For a given nominal concentration of V(IV), say $y_1$, the selection of an alkalinity value x indicates complete solubility of the V(IV) if the coordinate $(x,y_1)$ falls below the curve, whereas if the coordinate $(x,y_1)$ falls above the curve, part of the V(IV) may drop out of the solution as a precipitate.

It will be appreciated by those skilled in the art, that graphs similar to FIG. 1 could be prepared for pH values other than 8, within the pH range of 7.4 to 9, as well as for temperatures other than room temperature.

EXAMPLE 2

The effect of total alkalinity on the oxidation rate of V(IV) and V(V) under laboratory circumstances, was determined as follows.

Six specimens each containing from 1.1 to 1.2 g/l V(IV) and varying concentrations of total alkalinity at a pH of between about 8.0 and 8.3 were oxidized using nitrogen diluted air in an experimental oxidizer at room temperature. Three further specimens of which one contained 20 g/l and two contained 40 g/l of diethanolamine were also oxidized in the same oxidizer also using nitrogen diluted air. The results of all nine specimens are given in Table 1 and those of the first-mentioned six specimens are presented graphically in FIG. 2.

TABLE 1

| Effect of total alkalinity on reoxidation rate of V(IV) | | | |
|---|---|---|---|
| Unit | Run No | Total Alkalinity g/l $Na_2CO_3$ | DEA Content g/l | Re-oxidation rate mg V/l/min |
| 2 | 5 | 20.0 | 0 | 2.9 |
| 2 | 5 | 46.5 | 0 | 6.7 |
| 2 | 5 | 43.0 | 0 | 4.3 |
| 1 | 13 | 62.9 | 0 | 7.5 |
| 1 | 12 | 61.4 | 0 | 9.0 |
| 1 | 14 | 67.5 | 0 | 9.1 |
| 1 | 11 | 67.3 | 20 | 8.6 |
| 1 | 10 | 62.8 | 40 | 8.3 |
| 2 | 3 | 63.3 | 40 | 7.8 |

A straight line was fitted through the points by means of linear regression. The correlation coefficient was calculated to be 0.945 and the slope of the line was found to be 0.131, the inverse of which is 7.6. The latter figure represents the alkalinity (as g $Na_2 CO_3$/l) required to give a reoxidation rate of 1mg V/l min. It is also to be noted that the presence of diethanolamine made no significant difference to the oxidation rate.

EXAMPLE 3

A solution was made up to contain the following reagent concentrations:

| | |
|---|---|
| Total five-valent vanadium (as V) | 1.9 g/l |
| $Na_2CO_3$ | 40 g/l |
| $Na_2CO_3$ as $CO_3^{2-}$ | 22 g/l |
| Diethanol amine (DEA) | 40 g/l |
| NaSCN | 20 g/l |
| Total alkalinity (expressed as $Na_2CO_3$) | 60 g/l |

The solution was contacted with a gas consisting of 99 percent $CO_2$ and 1 percent $H_2S$ (by volume) in a glass laboratory unit, comprising a concurrent absorber, a reaction tank, an oxidizer, a balance tank and a circulating pump. Re-oxidation was carried out with a gas containing 26 percent air and 74 percent nitrogen (approximately 5 percent oxygen and 95 percent nitrogen). Nitrogen-diluted air was used instead of air in order to suppress the oxidation rate so that changes caused by different alkalinity levels could be more easily observed.

The following results were obtained with this liquor during a test run lasting 300 hours:

| | |
|---|---|
| Loading (i e amount of H₂S fed to the circulating liquor) = | 300 mg H₂S/l |
| Absorption = | 97.7 percent |
| Thiosulphate formation = | 0.13 g/l/day |
| Re-oxidation rate = | 8.4 mg V/l/min |
| Particle size of the sulphur = | 18 percent smaller than 3 micron |

The pH which initially was higher than 12, subsequently decreased to about 7.9–8.0 in the absorber and about 8.5 in the oxidizer. The sulphur formed was removed as a froth in the oxidizer. Formic acid was found to form, possibly as a breakdown product of DEA, at a rate of about 0.1 g/l/day.

EXAMPLE 4

Example 3 was repeated with a scrubbing liquor from which DEA had been omitted (i e the composition of the liquor was identical to that of Example 3, except for the omission of DEA). The liquor turned black soon owing to the formation of fine insoluble vanadium species in suspension. The suspended vanadium species also resulted in the sulphur product having a greyish colour. The vanadium was gradually lost from solution and the percentage absorption decreased sharply after about 3 days.

EXAMPLE 5

The experiment was repeated with a liquor as in Example 3 but containing no DEA and in which the total alkalinity expressed as $Na_2CO_3$ had been increased to 60 g/l.

During a run lasting 500 hours the liquor remained clear, with no sign of the formation of insoluble tetravalent vanadium species. The product sulphur was bright yellow. The following data were recorded:

| | |
|---|---|
| Loading = | 320 mg H₂S/l |
| Absorption = | 97.2 percent |
| Thiosulphate formation = | zero |
| Formic acid formation = | zero |
| Re-oxidation rate = | 8.6 mg V/l/min |
| pH in absorber = | 7.8–8.0 |
| pH in oxidizer = | 8.3–8.5 |

Most of the sulphur settled in the bottom of the reaction tank, from where it could be drawn off, leaving the oxidiser almost free of suspended sulphur.

Particle size of the sulphur: only 3 percent smaller than 3 micron.

EXAMPLE 6

The experiment was repeated with a scrubbing liquor as in Example 3 but containing no DEA and with a total alkalinity of 63 g/l expressed as sodium carbonate. A gas mixture containing 99 percent nitrogen and 1 percent H₂S was bubbled through this liquor. The solution had a pH of 9.98. After some time the experiment was discontinued because of the formation of a black insoluble precipitate.

In all the aforegoing examples, NaSCN was present in the scrubbing solution at a concentration of 20 g/l, in order to suppress the formation of thiosulfate. However, during further experiments in which NaSCN was omitted from the scrubbing solution it was found that although the thiosulphate formation increased, depending on the pH of the liquor, no noticeable effect on the solubility of four-valent vanadium or the reoxidation thereof to the five-valent state could be observed.

EXAMPLE 7

Sodium ammonium vanadate was used as received from the suppliers to prepare five specimen solutions with distilled water having the concentrations 0.04 M $V^{5+}$, 0.25 M NaSCN and the alkalinities (expressed as M $Na_2CO_3$) of respectively 0.095, 0.28, 0.38, 0.47 and 0.57.

Oxidation experiments were performed batchwise on each of the specimens after reduction. The $V^{5+}$ in the starting solutions was reduced with a $CO_2/H_2S$ gas mixture for varying times to achieve different $V^{4+}$ initial concentrations. After reduction, pure $CO_2$ was bubbled through the solution for 30 minutes to ensure that no unreacted H₂S remained. Oxidation was carried out with an air/CO₂ mixture, because air alone tended to strip CO₂ from the solution and change the pH. The gases were introduced through porous disks and further distributed in the mixture by agitation with a magnetic stirrer. The pH (8.5), dissolved oxygen content (3.5 to 5.5 mg/l) and temperature (38° C.) were kept constant throughout the experiments. Samples (1 ml) were withdrawn with syringes and analysed polarographically for $V^{5+}$. As all the air was expelled from the syringes during sampling, samples were stable for at least 3 to 4 hours. The $V^{4+}$ concentration was obtained as the difference between the total vanadium concentration and the $V^{5+}$ concentration. $^{51}$V-NMR spectra were recorded at 52.6 MHz using a Varian VXR200 instrument. Spectra were recorded at 23° C. The pH of the samples was adjusted to 8.5 if required by bubbling through CO₂. Capillary liquid VOCl₃ was used as standard.

The NMR assignments of these experiments are listed in Table 2, together with data from the literature, with which they are in good agreement.

We first established that the presence of NaSCN in solution did not produce any shifts or new peaks in the NMR spectra, except for a small lowering in the 562 ppm resonance. From variations in the resonances with changing experimental conditions, the following conclusions were drawn:

With increasing C/V ratio the cyclic tetramer converted progressively
into the dimer according to the reaction

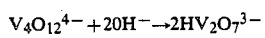

At a C/V ratio of 14, particularly at elevated temperature (e.g. above 40° C.) the tetramer rapidly converts to the dimer. As the temperature is increased to 80° C., the dimer in turn is increasingly deprotonated to the $V_2O_7^{4-}$ species. Lower stabilization of the dimer was found at increasingly lower C/V ratios.

We also found that the carbonate/vanadium (C/V) ratio was more important in stabilizing the dimeric form than the actual concentrations. Thus if in the sample of C/V ratio 14 in Table 2 more vanadium was dissolved to reduce the C/V ratio to 1.5, the major vanadium species was the tetramer. A relatively large concentration of carbonate (of course largely in the form of the bicarbonate) is required to stabilize vanadium in the form of the dimer.

In experiments on the kinetics of the oxidation of $V^{4+}$ to $V^{5+}$ it was found that at the C/V ratio of 14, the order of the reaction was one, with a first order rate constant of $2.22 \times 10^{-3} s^{-1}$. As the C/V ratio decreased a composite curve was obtained consisting of two straight lines, the gradients of which both decreased with decreasing C/V ratio. It was shown, however, that the composite curve was not due to an increase in the order of the reaction, but resulted from two concurrent reactions, viz. (a) the faster reoxidation reaction of the dimer, the rate of which decreases with decreasing C/V ratio, and (b) an appreciably slower reoxidation reaction of the tetramer.

At a C/V ratio of 2.4, only the tetramer is present, and the reduced species reoxidizes extremely slowly.

We tentatively draw the following conclusions about the role of alkalinity (expressed in the C/V ratio as sodium carbonate concentration, but actually present at pH 8.5 largely as bicarbonate):

At low C/V ratios the vanadium is present largely as the tetramer, whereas at high C/V ratios the equilibrium strongly favours the dimer, which is stabilized under these conditions. This stabilized dimer species is readily and rapidly reoxidized by aerial oxygen at 40° C., whereas the reduced cyclic tetramer is only reoxidized much more slowly.

TABLE 2

$^{51}V$ NMR ASSIGNMENTS AT A pH OF ca 8.5

| C/V* | \multicolumn{7}{c}{Vanadium (V) species} | References |
|---|---|---|---|---|---|---|---|---|
| | $HVO_4^{2-}$ | $V_2O_7^{4-}$ | $HV_2O_7^{3-}$ | $V_4O_{13}^{6-}$ | $V_4O_{12}^{4-}$ | $V_5O_{15}^{5-}$ | $V_6O_{17}^{4-}$ | |
| — | 537 | | 562 | 566–574 | 576.4 | 584.5 | | 1 |
| — | | | | | 572 | | | 2 |
| — | | | | | 574 | | 582 | 3 |
| — | | | | | 574 | | | 4 |
| 2.4 | | 554 | | 569.7 | 578.4 | | 586.8 | This work |
| 7.0 | | | 562.8 | 568.7 | 578.0 | | 585.7 | " |
| 11.8 | | | 562.8 | 568.7 | 577.4 | | | " |
| 14.0 | | | 564–565 | | 577.1 | | | " |

*The total carbonate (expressed as $CO_3^{2-}$)/vanadium ratio.
References:
1. L Petterson et al., Chemica Scripta 22, 254 (1983)
2. S E O'Donnell and M T Pope, J. Chem. Soc. Dalton Trans. 2290 (1976)
3. M A Habayeb and O E Hileman, Canad. J. Chem. 58, 2255 (1980)
4. O W Howarth and R E Richards, J. Chem. Soc. 864 (1965)

We claim:

1. A continuous process for removing hydrogen sulphide from a sour gas stream comprising hydrogen sulphide and carbon dioxide, including a step of contacting the gas stream with a scrubbing liquor comprising dissolved five-valent oxovanadium and a concentration of total alkalinity greater than a concentration required to maintain in solution any four-valent oxovanadium formed as a result of such contacting step, the alkalinity being present in the form of mainly bicarbonate ions and such concentrations of hydroxyl and carbonate ions as would be sufficient to maintain the pH of the liquor between 7.4 and 9 during the contacting step, the carbonate ion concentration, expressed as carbonate ions, being below 12.5 grams per liter, and the bicarbonate ion concentration expressed as sodium bicarbonate, being in excess of 30 grams per liter, the carbon dioxide concentration in the sour gas being sufficiently high to maintain the pH of the liquor below 9.

2. A process as claimed in claim 1, in which the scrubbing liquor comprises a maximum concentration of 10 g/l of complexing agents capable of preventing four-valent oxovanadium from precipitating from the liquor.

3. A process as claimed in claim 1, in which the pH of the scrubbing liquor is between 7.6 and 8.5.

4. A process as claimed in claim 3, in which the pH is about 8.0, the total alkalinity expressed as sodium carbonate, is in excess of 40 grams per liter and substantially all of the alkalinity is in the form of sodium bicarbonate.

5. A process as claimed in claim 1, in which the ratio of the concentration of total alkalinity expressed as sodium carbonate to the concentration of four-valent vanadium formed during the contacting step is greater than 24 grams per liter per gram of four-valent oxovanadium, expressed as vanadium, per liter.

6. A process for the regeneration of a spent scrubbing liquor used for the removal of hydrogen sulphide from a gas stream comprising hydrogen sulphide, by preferentially oxidizing the sulphur of hydrogen sulphide scrubbed out by the liquor to elemental sulphur with the aid of five-valent oxovanadium species in the scrubbing liquor, which species are simultaneously reduced from the five-valent to the four-valent state, the process including the steps of providing in the solution a sufficiently high concentration of total alkalinity to yield a desired reoxidation rate of the four-valent oxovanadium species, and oxidizing the oxovanadium species from the four-valent to the five-valent state by bubbling an oxygen-containing gas through the scrubbing liquor, the total alkalinity in the liquor being provided mainly in the form of bicarbonate ions and in such concentrations of hydroxyl and carbonate ions as would maintain the pH of the liquid between 7.4 and 9, the carbonate ion concentration, expressed as carbonate ions, being below 12.5 grams per liter, and the bicarbonate ion concentration, expressed as sodium bicarbonate, being in excess of 30 grams per liter.

7. A process as claimed in claim 6, in which the spent scrubbing liquor comprises less than 1 gram per liter of quinone and, less than 10 grams per liter of amine.

8. A continuous process for removing hydrogen sulphide from a sour gas stream comprising hydrogen sulphide and carbon dioxide, including the steps of:

contacting the gas stream in a scrubber with a scrubbing solution comprising five-valent oxovanadium species, whereby the sulphur of the hydrogen sulphide is preferentially oxidized to elemental sulphur and the vanadium of the oxovanadium species is simultaneously reduced to its four-valent state;

passing the scrubbing solution to an oxidizer; and oxidizing the vanadium of the oxovanadium species in the oxidizer to the five-valent state, by bubbling an oxygen-containing gas through the solution, the solution containing a sufficiently high concentration of
- total alkalinity at least to maintain in solution any four-valent oxovanadium formed in the scrubber, and to yield a reoxidation rate of the four-valent oxovanadium in the liquor at least high enough to permit steady-state operation of said process, the total alkalinity being present mainly in the form of bicarbonate ions and such concentrations of hydroxyl and carbonate ions as would maintain the pH of the liquor between 7.4 and 9, the carbonate ion concentration, expressed as carbonate ions, being below 12.5 grams per liter, the bicarbonate ion concentration, expressed as sodium bicarbonate, being in excess of 30 grams per liter, and the carbon dioxide concentration in the sour gas being sufficiently high to maintain the pH of the liquor below 9.

9. A continuous process as claimed in claim 8, in which the scrubbing solution comprises less than 1 gram per liter of quinone, less than 10 grams per liter of amine and less than 10 grams per liter of organic complexing agent.

10. A continuous process as claimed in claim 8, in which the total alkalinity of the solution, expressed as sodium carbonate, is in excess of 40 grams per liter.

* * * * *